July 1, 1930.  W. F. MacGREGOR  1,769,302
STRAW SPREADER
Filed May 26, 1927   2 Sheets-Sheet 1

Inventor
WALLACE F. MacGREGOR,
By James A. Walsh,
Attorney

July 1, 1930.  W. F. MacGREGOR  1,769,302
STRAW SPREADER
Filed May 26, 1927   2 Sheets-Sheet 2

Inventor
WALLACE F. MacGREGOR,
By James A. Walsh.
Attorney

Patented July 1, 1930

1,769,302

UNITED STATES PATENT OFFICE

WALLACE F. MacGREGOR, OF RACINE, WISCONSIN, ASSIGNOR TO J. I. CASE COMPANY, OF RACINE, WISCONSIN, A CORPORATION

STRAW SPREADER

Application filed May 26, 1927. Serial No. 194,343.

In the operation of harvester-thrashers it is the practice to employ a straw spreader on the traveling thrasher for distributing the the straw discharging therefrom along the ground in rear of the machine, and in attachments of this character which have come to my notice the spreader fans embodied therein have been so arranged as to deliver and spread the straw irregularly for the reason that the straw masses fall upon the entire rotating wheel, and the straw is therefore thrown outwardly at each side of the machine, and also forwardly of the spreader, as well as at the rear thereof, the latter deliveries being of a windrow formation and of considerable depth and volume compared to the shallow uneven deposits discharged at each side, which condition is unsatisfactory when plowing the straw under the soil for fertilizer. It is my object to provide a spreader of simple construction in connection with means for so controlling the straw discharging from the thrasher that it will be constantly and definitely delivered to a limited portion only of the spreader-wheel or wheels and positively discharged laterally from such predetermined location to a considerable distance from the machine and slightly scattered or spread in uniform condition so as to be readily plowed under, and in connection with the spreader I also provide a guard of novel character for preventing accidental contact with the spreader-wheel by attendants, my improved spreader being so mounted on the thrasher as to be swung to one side thereof for accessibility to the interior of the machine, and other advantages will be apparent from the following description.

Figure 1:
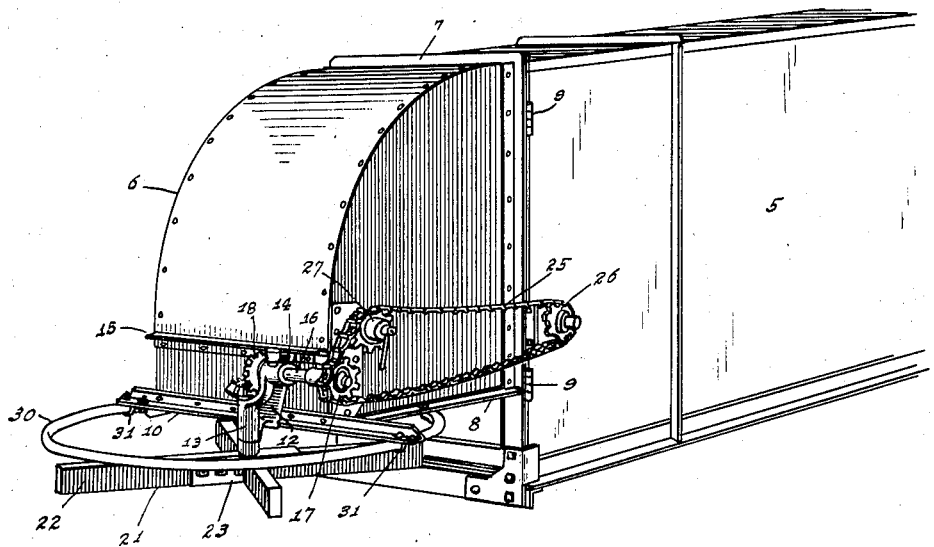
Figure 2:
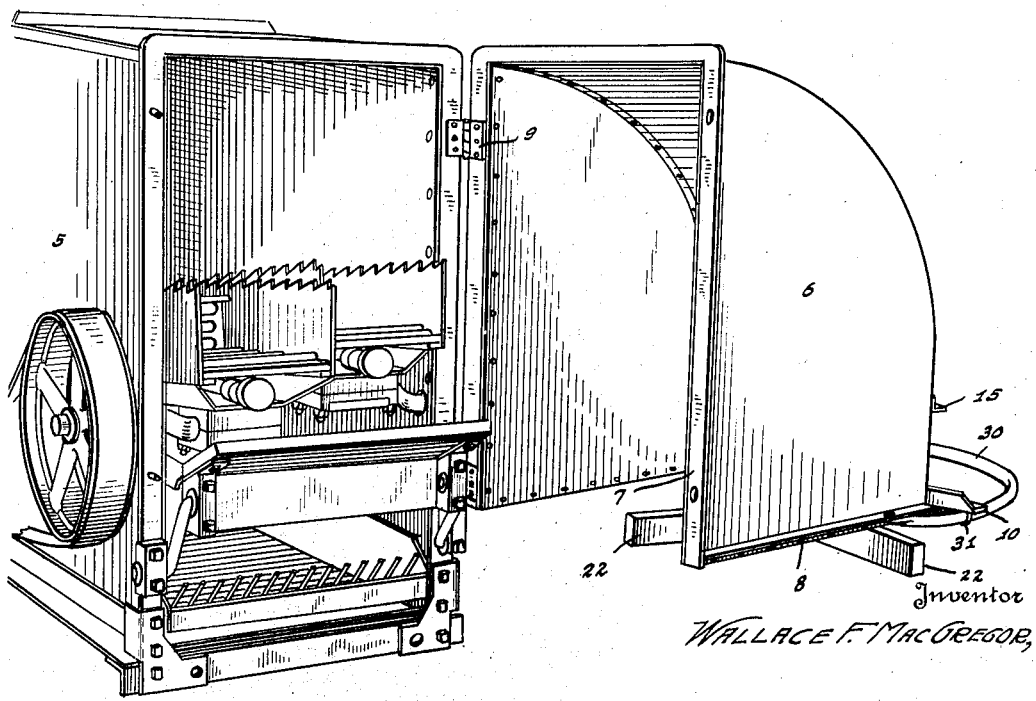
Figure 3:
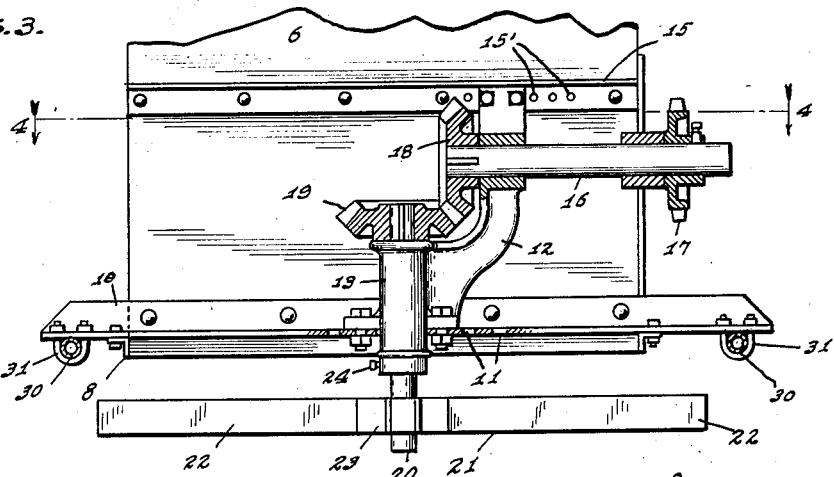
Figure 4:
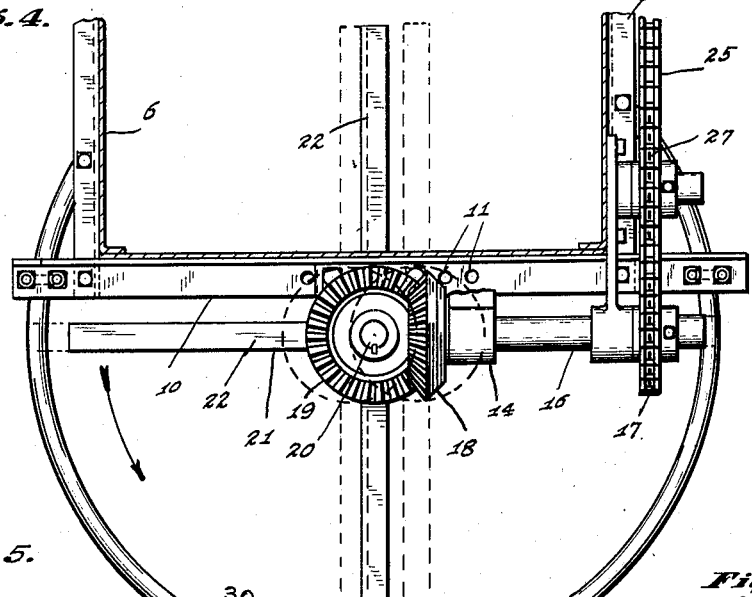
Figure 5:
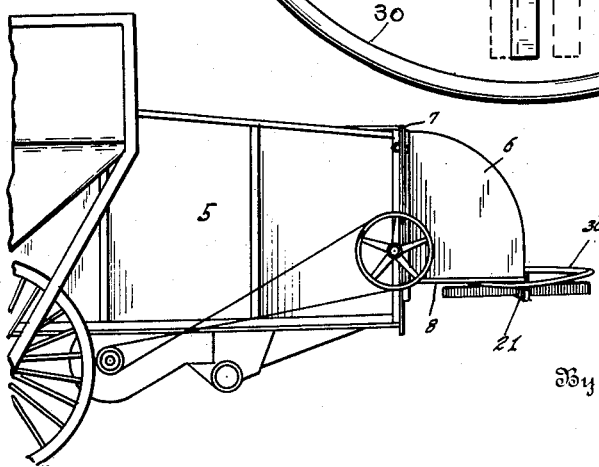
Figure 6:
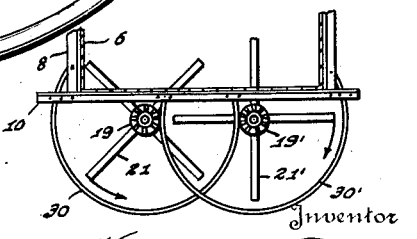

Referring to the accompanying drawings, forming part hereof, Figure 1 is a perspective of a fragmentary portion of a thrasher with my improved spreader mounted thereon; Fig. 2 a perspective showing the spreader equipment swung to one side of the thrasher to permit access to the interior of the latter; Fig. 3 an elevation of the spreader-wheel and parts associated therewith; Fig. 4 a plan of the wheel and guard extending thereabout, taken on the dotted line 4—4 in Fig. 3; Fig. 5 a fragmentary side elevation of a thrasher with my improvement applied thereto, and Fig. 6 is a plan of a modification of the rotary spreading mechanism.

In said drawings the numeral 5 indicates a thrasher of any suitable construction. My improved spreader comprises a hood or deflector, 6, having a frame 7, 8, preferably composed of angle-iron, which frame is hinged to the discharge end of the thrasher, as at 9. To the lower rear end of the hood I secure a brace, 10, which extends transversely of the hood, said brace having openings, 11, (Fig. 3), therein for a purpose to appear. Upon said brace I mount a gear frame, 12, embodying a vertical bearing, 13, and a horizontal bearing, 14, and also secure said gear frame at its upper end to a brace member, 15, or in other desired manner. In bearing 14 I mount a shaft, 16, which at its outer end supports a sprocket, 17, and at its inner end supports a bevel gear, 18, which meshes with a bevel gear, 19, mounted on shaft, 20, in the vertical bearing 13. Upon said shaft 20 is mounted a spreader-wheel, 21, of any appropriate construction, that shown comprising four wings, 22, mounted upon a socket, 23, said spreader-wheel being adjustably secured to shaft 20 by a set-screw, 24, so that it may be raised and lowered in relation to the hood 6, and by which simple means the wheel may be readily removed when shipping or storing the machine. The spreader-wheel is rotated by a chain, 25, connecting sprocket 17 to a driving sprocket, 26, on thrasher 5, and an adjustable tightener, 27, may be employed to properly adjust the chain 25. A guard, 30, having its ends connected to the frame 8 of the hood and further supported by the brace 10 by means of clips, 31, extends about the wheel so that the outer exposed portion of said spreader-wheel will be within the confines of the guard and accident to operators thus prevented. The hood 6 is detachably connected by bolts or otherwise to the side of the thrasher opposite to that of its hinge connection, as indicated in Fig. 2, so that the hood with the spreader-wheel may be swung to one side of the thrasher and ready access thus obtained to the interior of the thrasher and the hood.

By reference to Fig. 5, it will be observed that my improved spreader is positioned an appreciable distance from the ground, which is of importance, for the reason that as the machine passes over ground irregularities breakage or destruction of the spreader through violent contact with the ground is avoided, and which damage frequently occurs in the use of low down spreaders. It will also be noted that the driving mechanism for the spreader-wheel is outside the hood and thus centers the wheel accordingly so that the greater portion thereof is positioned rearwardly of the hood while the lesser portion is within the hood, with the result that the straw discharging from the thrasher through the hood or deflector is so confined by the latter that the rapidly rotating blades of the spreader-wheel have such a positive propelling action on the straw mass as to quite forcibly drive it through the space between the spreader-wheel and the lower edge of the hood at approximately the lower left-hand corner of the hood and through which space it clears and is not carried around to be thrown back into the thrasher separating mechanisms by the exposed portion of the rotating wheel, and as will be understood I am thus enabled to positively discharge the straw laterally from one point of delivery only and constantly in a predetermined direction to some distance from the side of the thrasher and spread the same in a comparatively thin layer suitable for plowing under. While I have stated that the straw is distributed from the left side of the thrasher it will be understood that the rotation of the spreader-wheel may be reversed and the distribution made from the right side, and further, by providing means such as the holes 11 and 15' for shifting the gear to the left or right the spreader-wheel may be adjusted closer to or further from the delivery side of the hood so that the direction of discharge may be varied, that is, the wheel may be adjusted to throw the straw on a line approximately transversely of the hood, or from the corner thereof, or the wheel may be positioned to discharge from a point slightly to the side of the corner, such variation of discharge being of advantage in that it is essential to spread each thin layer of straw slightly apart or separated from the strip previously laid, and not overlap one strip upon another to thus increase the depth of the straw and interfere with efficient plowing operations; in other words, should the harvester, which is attached in transverse relation to the thrasher, cut a swath of grain, nine or more feet in width for example, it is the object to spread the thrashed straw discharged by the spreader-wheel in thin layers or strips of approximately the same width and separated slightly from each other, and this result I am enabled to accomplish by adjusting the spreader-wheel to direct the straw at different angles from the hood; but where the harvester is of a size to cut an extremely wide swath, say approximately eighteen feet in width, I desire it to be understood that I may employ two spreader wheels of substantially the character shown in Fig. 6, one of which may embody the mechanisms described, the other being a duplicate, that is, provided with driving mechanism 19', paddle-wheel 21' and guard 30', or a single guard may be employed for encompassing both wheels, which are arranged side by side in connection with a deflector or hood of appropriate size, and that such arrangement will be within the scope of my invention, as it will be apparent that the thrasher element forming part of such combination machine must be of a correspondingly enlarged size to receive and thrash the increased volume of material resulting from the extremely wide cut of a harvester of the capacity indicated, and that the straw may be discharged from each side of the deflector in layers or strips as explained. In the manner described the distribution of the straw is efficiently controlled by confining it within the hood so that the spreader-wheel or wheels will so effectively eject the same that it will be spread in a uniformly thin layer at the side of the line of travel of the machinery without undue unevenness or irregularity commonly occurring by the use of spreaders of which I am aware.

I claim as my invention:

1. In a straw spreader, a deflector, a gear frame on the deflector, a driving shaft supported by the frame, a driven shaft supported by the frame, intermeshing gears on said shafts, a spreader-wheel supported by the driven shaft, means for driving said shafts to rotate said wheel, a protective guard for the wheel, and means for hinging the deflector to a thrashing machine whereby said deflector and the parts associated therewith may be swung in relation to said machine.

2. The combination, with a thrasher, of a deflector for directing material discharging from the thrasher, a spreader-wheel in the path of the discharging material partially extended beneath and within the confines of and so positioned in relation to the deflector that material deposited upon a portion of the wheel only will be ejected from such portion of the wheel laterally away from the thrasher, and means for imparting rotary motion to the wheel.

3. In a straw spreader, a deflector, driving mechanism secured to the deflector, a spreader-wheel secured to the driving mechanism and partially extending under the deflector and the remaining portion thereof extending exteriorly of the deflector, a guard encircling the outer portion of the wheel, means for adjusting the wheel laterally in relation to the deflector to control the direction of discharging material, means for adjusting the wheel vertically in relation to the deflector to increase or decrease the delivery space between the wheel and deflector, and means for hinging the deflector to a thrashing machine whereby said deflector, driving mechanism and wheel may be swung toward and from said machine.

4. In a straw spreader, a deflector, a distributing wheel secured to and spaced from the deflector a portion of which wheel extends under the deflector to receive material discharging therethrough and a portion of the wheel extending exteriorly from the deflector upon which no material is deposited, means for rotating said wheel, the material discharging from the deflector being deposited only upon that portion of the wheel extending thereunder and discharged thereby laterally through the space between the wheel and deflector, and a guard secured to the deflector and encircling the exterior portion of the wheel for the prevention of accidents.

5. In a straw spreader for a thrashing machine, a deflector, and a spreader wheel secured to the deflector in such relation thereto that a portion of the wheel is positioned in proximity to and under the deflector and the remaining portion of the wheel extends exteriorly of the deflector, that portion of the wheel rotating under the deflector receiving material and discharging the same laterally in relation to the direction of travel of the machine.

6. The combination, with a thrashing machine, of a deflector at the rear end thereof for directing material discharging therefrom, a rotating spreader wheel mounted on the deflector a portion of said wheel extending beneath the deflector and the remaining portion thereof extending exteriorly of the deflector, and means for rotating the spreader whereby material discharging from the deflector upon that portion only of the spreader wheel therebeneath is ejected from such wheel portion laterally in relation to the direction of travel of the thrashing machine.

In testimony whereof I affix my signature.

WALLACE F. MacGREGOR.